(12) United States Patent
Kreso

(10) Patent No.: US 6,347,519 B1
(45) Date of Patent: Feb. 19, 2002

(54) SYSTEM AND METHOD FOR MEASURING RECIRCULATED EXHAUST GAS FLOW IN A COMPRESSION-IGNITION ENGINE

(75) Inventor: Admir M. Kreso, Northville, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/641,256

(22) Filed: Aug. 17, 2000

Related U.S. Application Data

(60) Provisional application No. 60/193,837, filed on Mar. 31, 2000.

(51) Int. Cl.⁷ .......................... F02D 23/00; F02D 33/44
(52) U.S. Cl. ......................................... 60/602; 60/605.2
(58) Field of Search .......................... 60/600, 601, 602, 60/603, 605.1, 605.2

(56) References Cited

U.S. PATENT DOCUMENTS

| | | | |
|---|---|---|---|
| 5,214,920 A | * | 6/1993 | Leavesley ..................... 60/602 |
| 5,228,368 A | * | 7/1993 | Kato et al. ................. 60/602 X |
| 5,442,918 A | * | 8/1995 | Baeuerle et al. .............. 60/602 |
| 5,445,128 A | | 8/1995 | Letang et al. |
| 5,477,827 A | | 12/1995 | Weisman, II et al. |
| 5,710,370 A | | 1/1998 | Shanahan et al. |
| 5,736,650 A | | 4/1998 | Hiron et al. |
| 5,741,978 A | | 4/1998 | Gudmundsson |
| 5,750,903 A | | 5/1998 | Ryhanen |
| 5,904,666 A | | 5/1999 | DeDecker et al. |
| 5,905,208 A | | 5/1999 | Ortiz et al. |
| 5,987,888 A | * | 11/1999 | Weisman, II et al. .. 60/605.1 X |
| 6,000,221 A | | 12/1999 | Church et al. |
| 6,233,934 B1 | * | 5/2001 | Church et al. ................ 60/602 |

* cited by examiner

*Primary Examiner*—Hoang Nguyen
(74) *Attorney, Agent, or Firm*—Brooks & Kushman P.C.

(57) ABSTRACT

A system and method for measuring the flow rate of recirculated exhaust gas in a compression ignition engine including a plurality of engine sensors having outputs indicative of current engine conditions and a turbocharger. The system includes an exhaust gas recirculation (EGR) valve mounted in the exhaust pipe upstream of the turbocharger for diverting a selectable portion of the exhaust gas for recirculation and combination with the charge air, one or more sensors for sensing current conditions of the recirculated exhaust gas, including temperature and pressure, one or more sensors for sensing current conditions of the intake air, and control logic for determining the flow rate of the recirculated exhaust gas as a function of the sensed conditions. In one embodiment, the system includes an obstruction in the flow path of the recirculated exhaust gas and a differential pressure sensor for determining the pressure differential between a point upstream of the obstruction and a point downstream of the obstruction and control logic for determining the flow rate of the recirculated exhaust gas as a function of the current intake manifold pressure, the recirculated exhaust gas temperature, and the differential pressure drop across the obstruction.

9 Claims, 5 Drawing Sheets

SYSTEM AND METHOD FOR MEASURING RECIRCULATED EXHAUST GAS FLOW IN A COMPRESSION-IGNITION ENGINE

CROSS-REFERENCE TO RELATED APPLICATIONS

This application claims the benefit of U.S. provisional application Ser. No. 60/193,837 filed Mar. 31, 2000.

TECHNICAL FIELD

The present invention relates to systems and methods for controlling the ratio of the mixture of recirculated exhaust gas and intake air in a compression-ignition engine utilizing a turbocharger, and, in particular, a system and method for determining the flow rate of the recirculated exhaust gas.

BACKGROUND ART

In compression-ignition engines, such as heavy-duty diesel engines, the intake air is typically cooled and compressed, typically by using a turbocharger, to provide increased power density for the engine. Added flexibility in the compression of the intake air over a conventional turbocharger is often achieved by using a variable geometry turbocharger which may be controlled by the engine's electronic control module ("ECM") to supply varying amounts of turbo boost pressure to the engine, depending on various operating conditions. One system for controlling an engine having a VGT is disclosed in U.S. Pat. No. 6,000,221, issued to Church et al. on Dec. 14, 1999.

One important objective for compression-ignition engine designers is to reduce $NO_x$ emissions, while minimizing the negative impact on engine fuel economy and durability.

DISCLOSURE OF INVENTION

It is therefore an object of the present invention to provide a system and method for reducing $NO_x$ emissions in a compression-ignition engine employing a turbocharger.

It is another object of the present invention to provide a system and method for measuring the flow rate of exhaust gas which is recirculated for combination with intake air in a compression-ignition engine.

In carrying out the above objects and other objects and features of the present invention, a system and method are provided for measuring the flow rate of recirculated exhaust gas in a compression-ignition engine including a plurality of engine sensors having outputs indicative of current engine conditions and a turbocharger. The system includes an exhaust gas recirculation (EGR) valve mounted in the exhaust pipe upstream of the turbocharger for diverting a selectable portion of the exhaust gas for recirculation and combination with the charge air, one or more sensors for sensing current conditions of the recirculated exhaust gas, including temperature and pressure, one or more sensors for sensing current conditions of the intake air, and control logic for determining the flow rate of the recirculated exhaust gas as a function of the sensed conditions.

In one embodiment, the system includes an obstruction in the flow path of the recirculated exhaust gas, a temperature sensor mounted for sensing the temperature of the recirculated exhaust gas, and a differential pressure sensor including a first pressure tap located for sensing the pressure of the recirculated exhaust gas upstream of the obstruction and a second pressure tap located for sensing the pressure of the recirculated exhaust gas downstream of the obstruction, and wherein the control logic includes logic for determining the flow rate of the exhaust gas as a function of the differential pressure drop across the obstruction and the exhaust gas temperature.

In another embodiment, the system includes a first temperature sensor mounted for sensing the temperature of the recirculated exhaust gas, a second temperature sensor mounted for sensing the temperature of the charge air, and a third temperature sensor mounted for sensing the temperature of the mixture of charged air and recirculated exhaust gas, and wherein the control logic includes logic for determining the flow rate of the recirculated exhaust gas as a function of the temperatures sensed by the first sensor, the second sensor, and the third sensor.

One embodiment of the system employs a thin plate obstructor which defines a relatively small diameter orifice in the exhaust gas recirculation pipe, thereby creating a relatively high pressure drop as the gas flows through the orifice. The thickness of the obstructor preferably ranges from about to 0.03 to about 0.08 pipe diameters, and most preferably is about 0.05 pipe diameters. The orifice defined by the obstructor is a circular opening having a diameter between about 60 and 80 percent of the pipe diameter, and most preferably about 60 percent of the pipe diameter. In one embodiment, the edge of the plate defining the orifice is beveled to achieve a sharper edge on the orifice plate, to thereby reduce diesel particulate deposits on the edge defining the critical diameter of the obstructor. It will be appreciated that the embodiment of the present invention which utilizes this thin-wall, sharp-edged obstructor offers relatively greater accuracy over the sensor life, since the thin wall and sharp edge design of the obstructor minimizes the amount of diesel particulate deposits on the edges of the orifice obstructor which define the orifice. Such deposits would, over time, reduce the effective orifice area and, thereby, reduce the system's accuracy since, as is shown hereinafter, the EGR flow rate determination utilizes constants which are calibrated for the specific geometry.

In the differential pressure embodiment, the flow rate of the recirculated exhaust gas is determined from the voltage input from the differential pressure sensor, and from the sensed recirculated exhaust gas temperature, according to the following relation:

EGR Flow Rate (kg/min)=(EGR Gas Density/Density Correction)$^a$*b*(Differential Pressure Drop, kPa)$^c$ where the Density Correction, a, b and c are each calibratable constants for a particular orifice design.

One advantage of employing the embodiment of the present invention that determines the flow rate as a function of the differential pressure drop across an obstruction is that the currently available pressure sensors provide relatively more accurate readings in a relatively faster response time than other sensors. Thus, the EGR can be reliably determined even during transient engine operation conditions.

The embodiment of the present invention which employs sensed temperature differential utilizes sensor inputs from each of the charge air temperature sensor, recirculated exhaust gas temperature sensor, and charge air/recirculated exhaust mixture temperature sensor, determines the recirculated exhaust gas flow ratio (EGR%) according to the following relationship: The recirculated exhaust gas flow ratio $$EGR\% = \frac{\dot{m}_{egr}}{\dot{m}_{air}} = \frac{T_{mixture} - T_{air}}{T_{egr} - T_{mixture}}$$

It will be appreciated that one advantage of employing this embodiment of the present invention is that the system is non-intrusive to exhaust gas recirculation flow and results in a nearly non-existent pressure drop in the system.

In another embodiment of the present invention employs a differential pressure system of the type described above in conjunction with a differential temperature system so that, during steady state operation of the engine, the differential temperature system can be used to cross calibrate the differential pressure system.

The measuring system may be integrated with an engine control module (ECM) to provide an accurate EGR flow measurement as input to the ECM which can be used as feedback for the EGR valve, and/or the VGT controller to adjust the EGR valve and/or VGT vane positions and, consequently, control the rate of exhaust gas recirculation in a closed loop.

It will thus be appreciated that the system of the present invention allows for an accurate EGR flow measurement, thereby providing closed-loop controller feedback and input by which suitable control logic can detect a malfunction or tampering with the EGR flow circuit.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
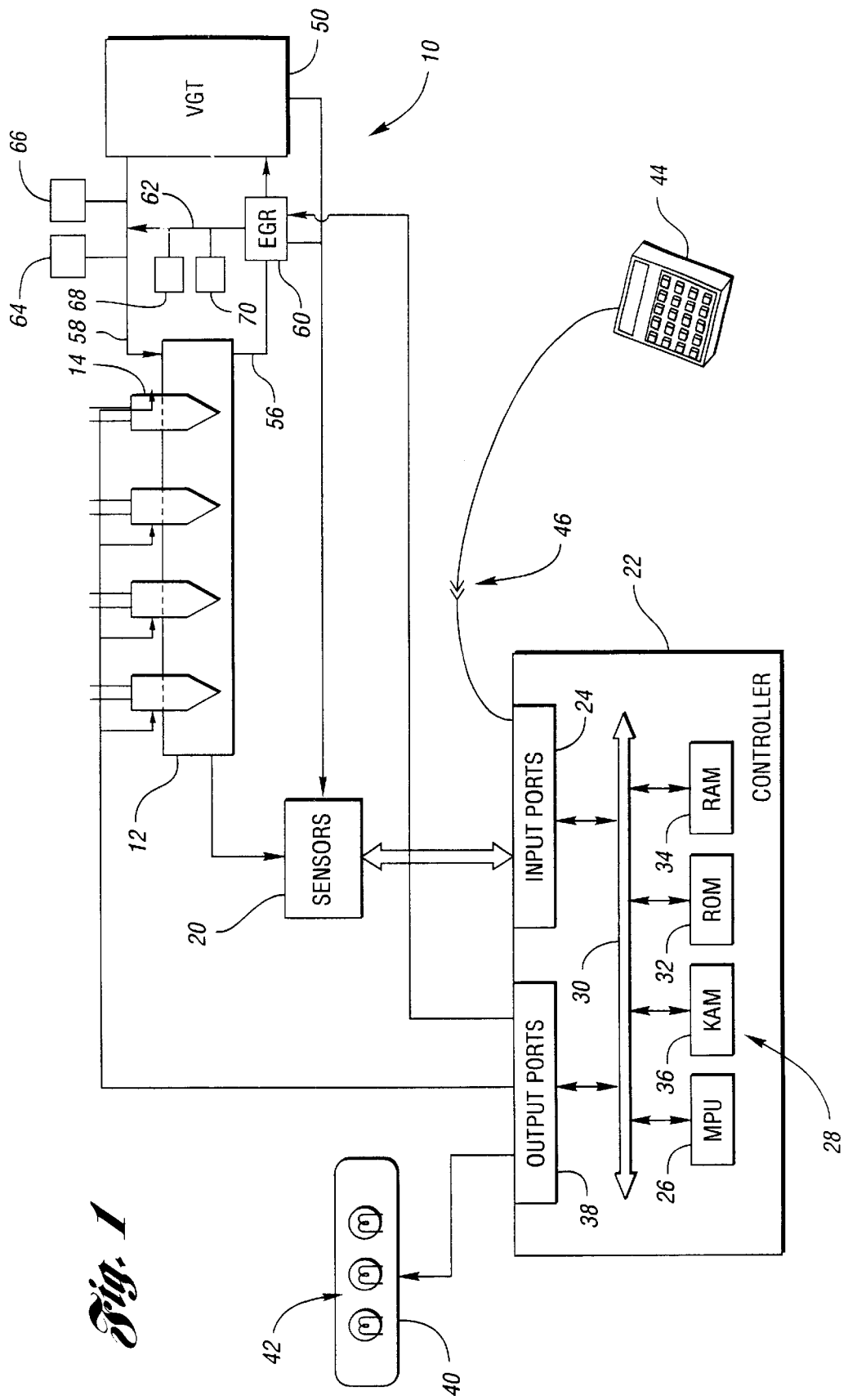
FIG. 1 is a schematic diagram of the system of the present invention.

Referring now to FIG. 1, a system for controlling a compression ignition engine including the present invention is shown. The system, generally indicated by reference numeral 10, includes a compression ignition engine 12 having a plurality of cylinders, each fed by a fuel injector 14. The engine typically utilizes 4, 6, 8, 12, 16, or 24 cylinders, but may employ any other number of cylinders as desired. The fuel injectors 14 receive pressurized fuel from a supply connected to one or more high or low pressure pumps (not shown) as is well known in the art. Alternatively, the system may employ a plurality of unit pumps (not shown), each pump supplying a fuel to one of the injectors 14.

The system 10 includes a variable geometry turbocharger 50 for drawing air into the cylinders to create increased power during combustion. Engine exhaust gas is routed to the turbocharger turbine inlets along line 56. Air drawn into the engine air intake is routed through the compressor and to the engine through air inlet lines 58. It should be appreciated that the present invention may be employed with an engine which utilizes any conventional turbocharger. However, in the preferred embodiment the system is employed with a diesel engine and a variable geometry turbocharger ("VGR"). It also is to be understood that the single turbocharging system is shown for purposes of illustration, and that systems and methods of the present invention may be employed in a multiple turbocharging system.

The system 10 also includes various sensors 20 for generating signals indicative of corresponding operational conditions or parameters of the engine 12, the vehicle transmission (not shown), turbocharger 50, and/or other vehicular components. The sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as a read only memory (ROM) 32, random access memory (RAM) 34, keep-alive memory (KAM) 36, and the like. The computer readable storage media may be implemented by any of a number of know physical devices capable of storing information representing instructions executable via a computer such as controller 22. Known devices may include, but are not limited to, PROM, EPROM, EEPROM, flash memory, and the like, in addition to magnetic, optical, and combination media capable of temporary or permanent data storage.

Computer readable storage media 28 implement control logic via software, firmware, hardware, micro code, and/or discrete or integrated circuitry to affect control of various systems and subsystems of the vehicle, including the engine 12, a vehicle transmission (not shown), the turbocharger 50, and the EGR valve, and other sensors and components as hereinafter described. Controller 22 receives signals from sensors 20 via input ports 24 and generates output signals which may be provided to various actuators and/or components via output ports 38. Signals may also be provided to a display device 40 which includes various indicators such as lights 42 to communicate information relative to system operation to the operator of the vehicle.

A data, diagnostics, and programming interface 44 may also be selectively connected to the electronic engine controller module (ECM) 22 via a plug 46 to exchange various information therebetween. Interface 44 may be used to change values within the computer readable storage media 28, such as configuration settings, calibration variables, fault threshold values, action threshold values, control logic, look-up tables, calibrated constants, and the like.

In operation, controller 22 receives signals from sensors 20 and executes control logic to control one or more variable geometry turbochargers by controlling an actuator capable of changing the current turbocharger geometry so as to track a desired turbocharger geometry. The desired turbocharger geometry is determined based on any number of engine conditions and/or parameters indicative of engine conditions. For example, an engine speed parameter indicative of engine speed, a filtered rate of change of the engine speed parameter, an engine torque parameter indicative of current engine torque demand, and/or a rate of change of the engine torque parameter may be used as a basis for the desired turbocharger geometry. Other engine conditions and/or parameters indicative of such conditions may be used as desired. And, as further described herein, the recirculated exhaust gas flow rate and/or recirculated exhaust gas ratio determined by the system and method of the present invention may also be used as an input to the controller to be utilized as a basis for determined desired turbocharger geometry.

As thus far described, the system of the present invention is known and is commercially available. In one embodiment, the ECM 22 is a DDEC controller available from Detroit Diesel Corporation, Detroit, Mich. Various other features of this controller are described in detail in U.S. Pat. Nos. 6,000,221, 5,477,827, and 5,445,128, the disclosures of which are hereby incorporated by reference in their entirety.

With continuing reference to FIG. 1, the system 10 also includes an exhaust gas recirculation (EGR) valve 60 mounted in the exhaust line 56 and operable to divert a selectable portion of the exhaust gas through line 62 for recirculation and combination with the charged air supplied by the VGT 50 through intake line 58. The system further includes an intake manifold pressure sensor (shown as 54 in FIG. 2) as one of the sensors. And, as will be described in further detail hereinafter, a plurality of temperature sensors 64, 66, and 68, and a pressure sensor 70 are mounted at selected points in lines 56, 58, and 62 to provide temperature and pressure information which is utilized by the logic of the present invention to measure recirculated exhaust gas flow in the system 10. It should be noted that the pressure and temperature sensors employed in the system of the present invention may be any of a variety of commercially available sensors, selected to suit the particular engine operating conditions for the engine with which the system is implemented.

Figure 2:
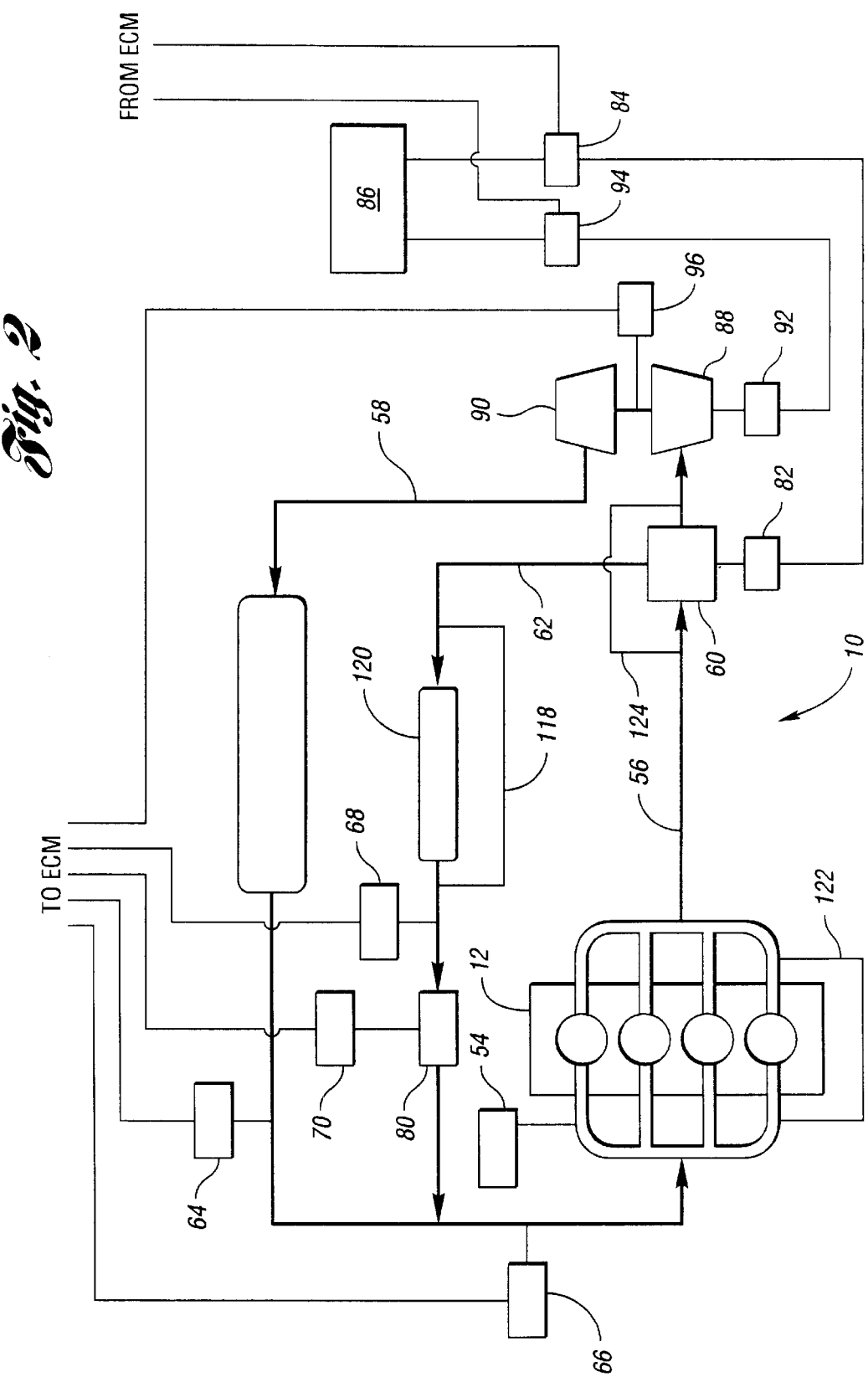
FIG. 2 is a more detailed schematic illustrating potential locations of the sensors and obstructor in the recirculated exhaust gas and the charge air intake of the engine.

FIG. 2 schematically illustrates the recirculated exhaust gas flow system of the present invention in greater detail. EGR 60 is controlled via an actuator 82. In one embodiment, this actuator is a pneumatic actuator which is activated by a solenoid valve 84, connected to outputs from the ECM 22 to receive suitable control signals to regulate pressure from a compressed air supply 86 to pneumatically activate and deactivate the EGR valve actuator 82 to position the EGR valve 60 as desired. In one embodiment, the EGR valve 60 is controlled to move between a closed position (i.e., none of the exhaust gas is diverted for recirculation into the charge air), and a single, factory-selected open position which diverts a portion of the gas for recirculation. Alternatively, the EGR valve 60 may be provided with a plurality of discrete controllable vane positions, or an infinitely positionable vane which may be controlled as described herein to vary the mix of recirculated exhaust gas and charged air. The remainder of the exhaust gas is supplied via line 56 to drive the turbine component 88 of the VGT, thereby powering the compressor component 90 of the VGT to supply compressed air to the engine through intake line 58. The VGT is typically also controlled by an actuator, such as pneumatic actuator 92 which, in one embodiment is activated by a PVH valve 94 controlled by input signals from the ECM 22. A turbocharger speed sensor 96 may be connected to the VGT to provide VGT speed information to the ECM 22.

With continuing reference to FIG. 2, one embodiment of the present invention employs an obstruction, such as obstructor 80 in the recirculated exhaust gas line 62. In this embodiment, the pressure sensor 70 is a commercially available differential pressure sensor, which includes two pressure measurement taps (shown as $P_1$ and $P_2$ in FIG. 3) mounted to sense the pressure downstream and upstream, respectively, of the obstructor 80. A temperature sensor 68 is mounted in recirculated exhaust gas line 62 to provide exhaust gas temperature data to the ECM 22. The control logic of this embodiment of the present invention (illustrated in FIG. 5) utilizes the differential pressure data provided by the differential pressure sensor 70, the exhaust gas temperature data provided by temperature sensor 68, and intake manifold pressure data provided by the pressure sensor 54 to determine EGR flow.

Figure 5:
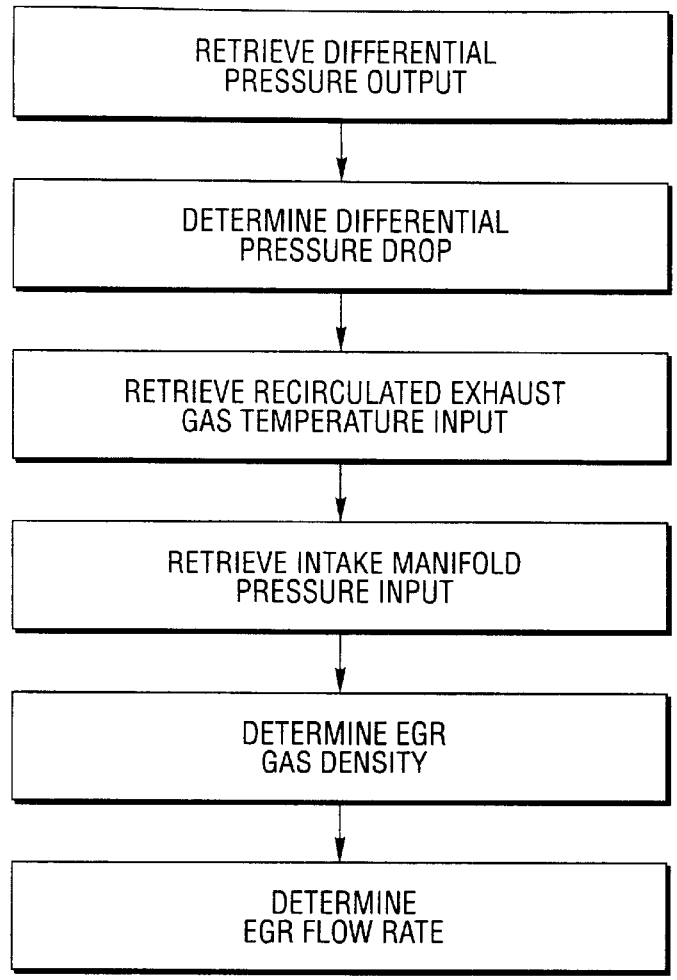
FIG. 5 is a block diagram illustrating the control logic for determining the EGR flow rate utilizing the differential pressure drop method of the present invention.

Referring now to FIG. 5, the EGR flow is determined by the control logic utilizing the voltage input from the differential pressure sensor as follows: in one embodiment the pressure is calibrated linearly between 0.5 and 4.5 volts for pressure ranging from 0 to 5 pounds per square inch. The correlation, in kPa to voltage is shown as the following equation:

$$\text{Differential Pressure Drop, kPa} = a*(\text{Sensor Voltage}) - b \quad (1)$$

where a and b are constants which are calibrated by flow bench trials.

The differential pressure drop is related to EGR flow rate through the following correlation:

$$\text{EGR Flow Rate (kg/min)} = (\text{Density}/\text{Density Correction})^a * b * (\text{Differential Pressure Drop, kPa})^c \quad (2)$$

where the Density Correction, a, b, and c are also constants which may be calibrated for a particular obstructor geometry by flow bench trials.

The EGR gas density is calculated from the EGR temperature, provided by sensor 68 and intake manifold pressure, provided by sensor 54, according to the following equation:

$$\text{Density} = (\text{Intake Pressure, kPa}) / (\text{EGR Temperature, K} * 0.2876) \quad (3)$$

Figure 3:
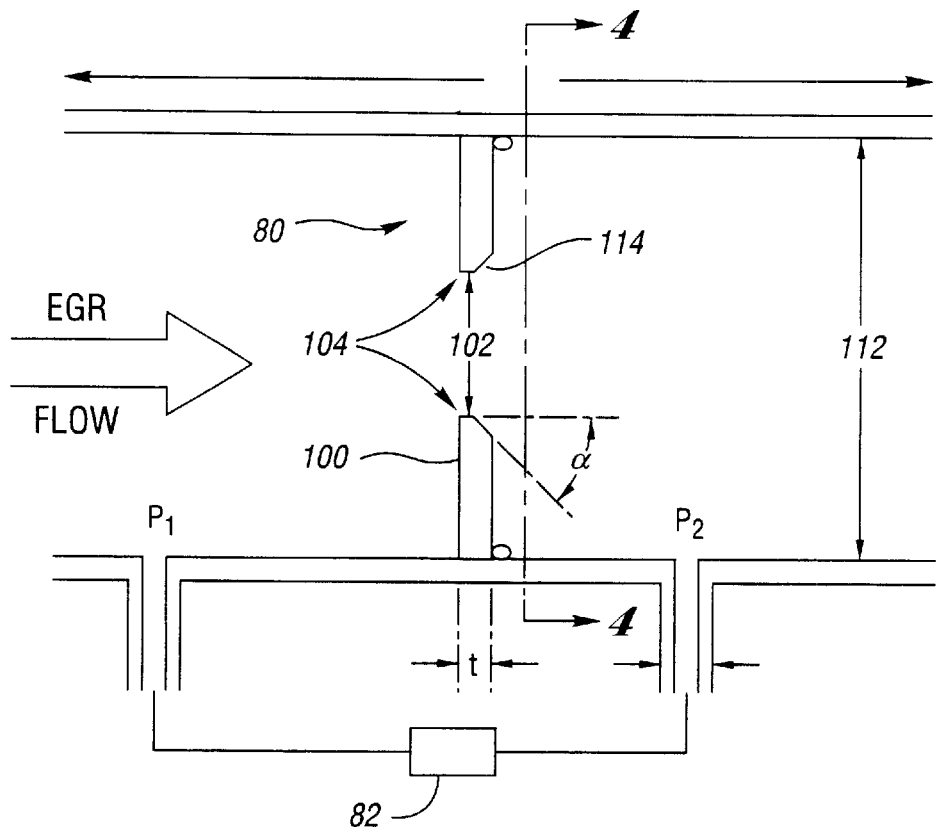
FIG. 3 is a schematic diagram of the obstructor employed in one embodiment of the present invention.
Figure 4:
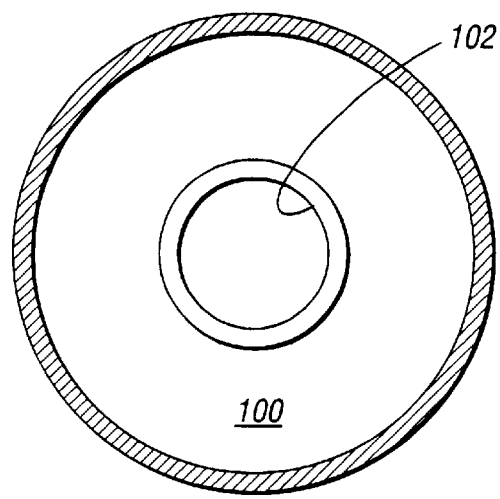
FIG. 4 is a cross sectional view, at 4—4, of the exhaust gas recirculation pipe and obstructor shown in FIG. 3.

One embodiment of the obstructor 80, illustrated in greater detail in FIGS. 3 and 4, is a thin walled plate 100 which defines a circular orifice 102. The plate 100 is mounted within line 62 to obstruct EGR flow and, thereby, create a pressure differential upstream and downstream of the plate 100. It is, of course, desirable that the pressure differential information provided by sensor 70 be accurate throughout the lifetime of the system. It is, therefore, desirable to employ an obstructor which inhibits the deposition of diesel particulates in the recirculated exhaust gas stream upon the obstructor, since these deposits, over time, could effectively change the size of the orifice 102 and, thereby, affect the accuracy of the EGR flow determination. The thin wall plate 100 illustrated in FIGS. 3 and 4 is also preferably provided with a sharp edge to minimize particulate deposits.

Figure 6:
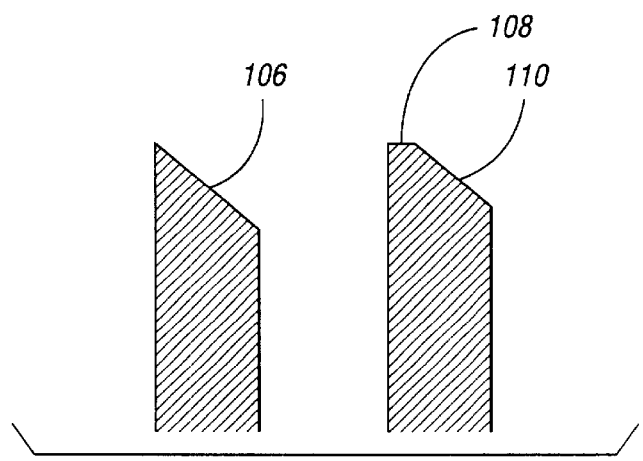
FIG. 6 is a partial cross-sectional view of two embodiments of the edge of the obstructor shown in FIGS. 3 and 4.

As illustrated in FIG. 6, though the ideal geometry of the orifice edge is shown at 106, the edge of the plate is preferably designed to have a flat portion 108 and a bevel 110. This design provides a relatively sharp edge that insures that the plate can be reliably manufactured to provide the desired orifice diameter. In contrast, fabrication of the sharper edge 106 is likely to yield a greater variability in orifice size when machining the edge to a point.

It will be appreciated that it is desirable to design the orifice 102 in such a manner so as to minimize the pressure drop while still yielding reliable pressure differential data for the EGR flow determination. It has been found that the orifice is effective when its diameter ranges from about 40% to about 80% of the pipe diameter 106. Preferably, the orifice size is about 60% of the pipe diameter 106.

The exit edge of the orifice 114 is Preferably provided with a bevel having an angle that minimizes particulate deposits on the orifice edge. It has been found that a bevel angle, a, of from about 30° to about 60°, and preferably about 45°, effectively inhibits particulate deposits on the orifice edge. In one embodiment, the thickness, t, of the orifice plate is approximately 5% of the pipe diameter 106.

It should be appreciated that the present invention may utilize differential pressure information sensed upstream and downstream of any obstruction in the recirculated exhaust gas line 62 without departing from the spirit of the present invention. For example, instead of using an obstructor 80 of a particular design, the pressure sensors may be mounted as shown at 18 to determine the pressure drop across the exhaust gas cooler 120, across the EGR valve 60 (as shown at 124), or between the intake and exhaust line of one of the engine cylinders (at 122), or at any other inherent obstacle in the recirculated exhaust gas path. Of course, the calibrated constants will be different for each type of obstruction, since they depend upon the geometry of the obstruction. For example, the pressure drop across the EGR valve 60 is calculated according to the following equation:

$$\text{EGR Flow Rate (kg/min)} = (\text{Cd Function})^{*}(\text{Density/Density Correction})^{a}*B*(\text{Differential Pressure Drop, kPa})^{c} \quad (4)$$

where a, B, or c are calibratable constants, and where Cd Function is the discharge coefficient of the EGR valve.

It will be appreciated that, although the calibration of the EGR valve may be more complex than the thin plate obstructor embodiment, using an inherent obstruction eliminates the need to add a designed obstructor, thereby reducing the EGR loop pressure drop and the fuel penalty associated with such a pressure drop.

Figure 7:
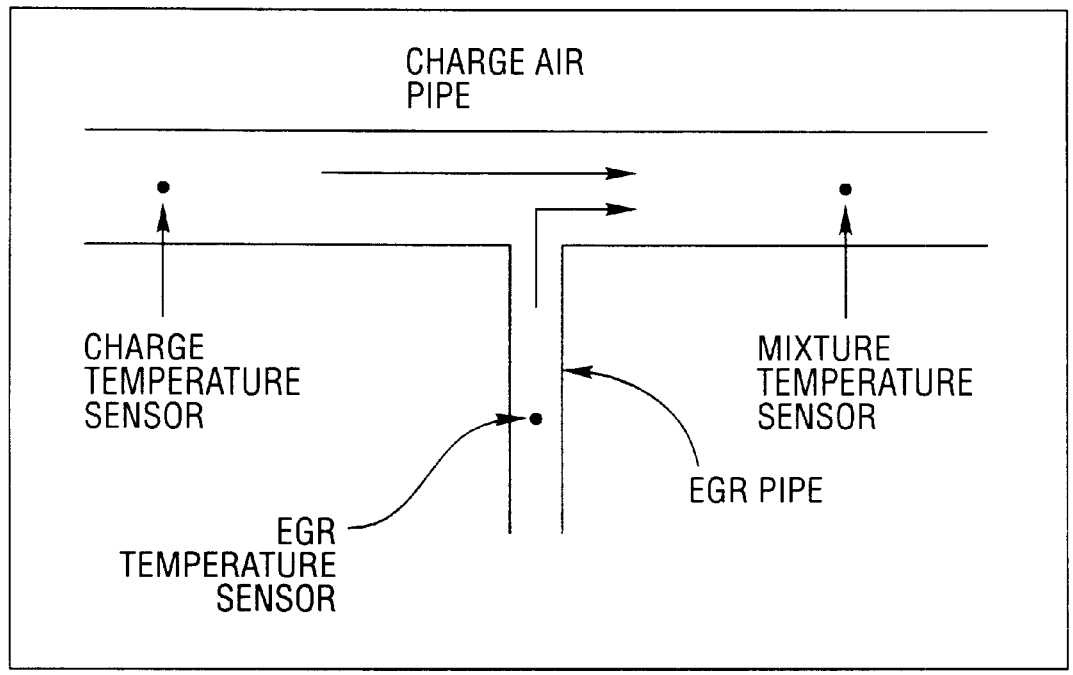
FIG. 7 is a schematic diagram illustrating one embodiment of the present invention which measures the EGR flow ratio as a function of charge air temperature, recirculated exhaust gas temperature, and charge air/exhaust gas mixture temperature.

Referring now to FIG. 7, the ratio between the mass flow of recirculated exhaust gas and charge air may be calculated as a function of the charge air temperature, recirculated exhaust gas temperature, and charge air/exhaust gas mixture temperature. Thus, temperature sensors 66 and 64 may be mounted to sense charge air temperature and charge air exhaust gas mixture temperature, respectively, and utilized in addition with temperature data sensed by temperature sensor 64 (as shown in FIG. 2) to determine an EGR rate:

$$EGR\% = \frac{\dot{m}_{egr}}{\dot{m}_{air}} = \frac{h_{mixture} - h_{air}}{h_{egr} - h_{mixture}} \quad (5)$$

the EGR rate calculation can be further simplified with the approximation that entropy, h, equals temperature (in degrees Kelvin). With this assumption, the equation becomes:

$$EGR\% = \frac{\dot{m}_{egr}}{\dot{m}_{air}} = \frac{T_{mixture} - T_{air}}{T_{egr} - T_{mixture}} \quad (6)$$

Figure 8:
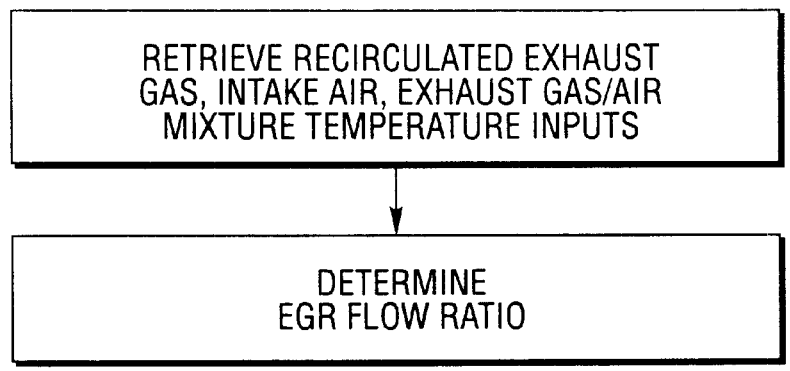
FIG. 8 is a block diagram illustrating the control logic for the differential temperature embodiment of the present invention.

FIG. 8 illustrates the logic employing this temperature differential method of determining the EGR ratio.

It should be appreciated that the temperature differential method has the advantage of being less intrusive than the differential pressure method, since there is no pressure drop associated with an obstructor. However, current temperature sensors are not as quickly responsive to changing transient conditions and, therefore, the system employing the temperature differential method is currently less desirable for measuring exhaust gas flow in an engine which has transient operating conditions in its normal use. However, in one embodiment of the present invention both the temperature differential and pressure differential system may be simultaneously employed to separately and independently determine recirculated exhaust gas flow, thereby providing the EGM with the capability of cross calibrating the differential pressure measurement with the differential temperature measurement, particularly during steady state operating conditions.

The present invention thus provides a simple, reliable system and method for measuring recirculated exhaust gas flow in a turbocharged compression ignition engine. This measurement may be used by the ECM to optimize the mixture of recirculated exhaust gas with charge air to optimize emissions and engine performance objectives. In particular, the system of the present invention may be utilized to provide recirculated exhaust gas flow measurement data to EGR valve control logic and/or VGT control logic to provide closed loop feedback control of these system components. One embodiment of an engine control system which may employ the system and method of the present invention for closed-loop feedback control of the EGR valve and/or turbocharger is disclosed in patent application Ser. No. 09/540,017, for a "METHOD OF CONTROLLING AN ENGINE WITH AN EGR SYSTEM," filed concurrently herewith naming S. Miller Weisman, II, Admir Kreso, and Andrew May as inventors, the disclosure of which is incorporated by reference herein in its entirety.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for measuring the mass flow rate of recirculated exhaust gas in a vehicle having a compression-ignition engine, a plurality of engine sensors having outputs indicative of current engine conditions including an intake manifold pressure sensor, and a variable geometry turbocharger in which geometry is varied by a controllable actuator, the system comprising:

an exhaust gas recirculation valve mounted in the engine exhaust line for controllably diverting a selected portion of the exhaust gas for mixture with intake air;

a temperature sensor mounted in the flow path of the recirculated exhaust gas;

an obstruction in the flow path of the recirculated exhaust gas;

a differential pressure sensor including a first pressure tap located for sensing the pressure of the recirculated exhaust gas upstream of the obstruction, and a second pressure tap located for sensing the pressure of the recirculated exhaust gas downstream of the obstruction; and control logic for determining flow rate of the recirculated exhaust gas as a function of the current intake manifold pressure, recirculated exhaust gas temperature, and differential pressure drop across the obstruction.

2. The system of claim 1 wherein the obstruction is a thin plate obstructor mounted in the recirculated exhaust gas pipe, and wherein the obstructor defines an orifice having a diameter of between about 40% and about 80% of the diameter of the recirculated exhaust gas pipe.

3. The system of claim 2 wherein the edge of the plate which defines the orifice is sharp.

4. The system of claim 3 wherein the edge of the obstructor defining the orifice is beveled on the downstream side of the orifice at an angle of between about 30° and about 60° from horizontal.

5. The system of claim 4 wherein the edge of the plate defining the orifice is beveled on the downstream side of the orifice at an angle of about 45°.

6. The system of claim 2 wherein the obstructor defines an orifice having a diameter of about 60% of the diameter of the recirculated exhaust gas pipe.

7. The system of claim 1 wherein the control logic for determining the flow rate of the recirculated exhaust gas determines the differential pressure drop across the obstruction according to the following relationship:

Differential Pressure Drop, kPa=$a$*(Sensor Voltage)−$b$;

wherein the control logic determines the recirculated exhaust gas density according to the following relationship:

Density=(Intake Pressure,kpa)/(EGR Temperature, $K$*0.2876);

and wherein the control logic determines the recirculated exhaust flow rate according to the following relationship:

EGR Flow Rate (kg/min)−(Density/Density Correction)$^a$*$b$*(Differential Pressure Drop, kPa)$^c$.

8. A system for measuring the flow ratio of recirculated exhaust gas to charge air in a vehicle having a compression-ignition engine, a plurality of engine sensors having outputs indicative of current engine conditions, and a variable geometry turbocharger in which geometry is varied by a controllable actuator, the system comprising:

an exhaust gas recirculation valve mounted in the engine exhaust line for controllably diverting a selected portion of the exhaust gas for mixture with intake air;

a first temperature sensor mounted for sensing the temperature of the recirculated exhaust gas;

a second temperature sensor mounted for sensing the temperature of the charge air;

a third temperature sensor mounted for sensing the temperature of the mixture of charged air and recirculated exhaust gas; and control logic for determining the flow ratio of the recirculated exhaust gas as a function of the temperature of the charge air, the temperature of the recirculated exhaust gas, and the temperature of the mixture of charge air and recirculated exhaust gas.

9. The system for claim 8 wherein the control logic for determining the flow ratio of the recirculated exhaust gas is based upon the relationship:

$$EGR\% = \frac{\dot{m}_{egr}}{\dot{m}_{air}} = \frac{T_{mixture} - T_{air}}{T_{egr} - T_{mixture}} \quad (6)$$

* * * * *